(12) United States Patent
Co et al.

(10) Patent No.: US 8,807,596 B1
(45) Date of Patent: Aug. 19, 2014

(54) AIRBAG AND VEHICLE PASSENGER RESTRAINT SYSTEM

(71) Applicant: Ford Global Technologies, LLC, Dearborn, MI (US)

(72) Inventors: Juanito Yu Co, Ann Arbor, MI (US); Jeff Steven Vinton, Farmington Hills, MI (US); Nathan Kristofor Tardif, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/755,005

(22) Filed: Jan. 31, 2013

(51) Int. Cl.
*B60R 21/2338* (2011.01)
(52) U.S. Cl.
USPC ...................................................... 280/743.2
(58) Field of Classification Search
USPC ........................................................ 280/743.2
See application file for complete search history.

(56) References Cited

U.S. PATENT DOCUMENTS

| | | | | |
|---|---|---|---|---|
| 5,310,214 A * | 5/1994 | Cuevas | ........................ | 280/729 |
| 5,593,179 A * | 1/1997 | Maruyama | .................... | 280/740 |
| 6,679,522 B2 * | 1/2004 | Igawa | ........................ | 280/743.1 |
| 6,736,426 B2 | 5/2004 | Winters et al. | | |
| 7,128,337 B2 * | 10/2006 | Kwon | ........................ | 280/743.1 |
| 7,131,664 B1 * | 11/2006 | Pang et al. | ................. | 280/743.2 |
| 7,152,880 B1 * | 12/2006 | Pang et al. | ................. | 280/743.2 |
| 7,192,053 B2 * | 3/2007 | Thomas | ........................ | 280/739 |
| 7,243,947 B2 * | 7/2007 | Bosch | ........................ | 280/743.1 |
| 7,264,270 B2 * | 9/2007 | Miyata et al. | .............. | 280/743.2 |
| 7,350,807 B2 * | 4/2008 | Schneider et al. | ............ | 280/732 |
| 7,360,789 B2 * | 4/2008 | Bito | ........................... | 280/743.1 |
| 7,455,317 B2 * | 11/2008 | Bito | .............................. | 280/732 |
| 7,458,605 B2 | 12/2008 | Hasebe et al. | | |
| 7,530,596 B2 * | 5/2009 | Bito | ............................. | 280/739 |
| 7,540,534 B2 * | 6/2009 | Hasebe et al. | ............. | 280/743.1 |
| 7,607,690 B2 | 10/2009 | Abe et al. | | |
| 7,625,008 B2 * | 12/2009 | Pang et al. | ................. | 280/743.1 |
| 7,695,012 B2 * | 4/2010 | Libby et al. | ................ | 280/743.1 |
| 7,784,828 B2 * | 8/2010 | Matsu et al. | .................. | 280/739 |
| 7,789,421 B2 | 9/2010 | Issler et al. | | |
| 7,789,423 B2 * | 9/2010 | Kim | ........................... | 280/743.2 |
| 7,857,347 B2 | 12/2010 | Abe et al. | | |
| 7,862,073 B2 * | 1/2011 | Thomas | ........................ | 280/729 |
| 7,862,082 B2 * | 1/2011 | Thomas | ........................ | 280/740 |
| 7,874,585 B2 * | 1/2011 | Furuno et al. | .............. | 280/743.1 |
| 7,909,362 B2 * | 3/2011 | Idomoto et al. | ............ | 280/743.1 |
| 7,914,041 B2 * | 3/2011 | Aranzulla et al. | ......... | 280/743.2 |
| 7,938,445 B2 * | 5/2011 | Smith et al. | ................ | 280/743.2 |
| 7,946,619 B2 * | 5/2011 | Mendez | ..................... | 280/743.1 |
| 8,002,309 B2 * | 8/2011 | Kim et al. | ...................... | 280/729 |
| 8,011,691 B2 * | 9/2011 | Urushibata et al. | ......... | 280/743.2 |
| 8,020,890 B2 * | 9/2011 | Webber | ......................... | 280/739 |

(Continued)

FOREIGN PATENT DOCUMENTS

JP 2007230501 A 9/2007
JP 2011195018 A 10/2011

*Primary Examiner* — Nicole Verley
(74) *Attorney, Agent, or Firm* — Franklin MacKenzie; Ford Global Technologies, LLC

(57) ABSTRACT

An exemplary passenger airbag for a vehicle passenger restraint system may include an inflatable cushion having an upper rear portion with a convex surface and a lower rear portion with a concave surface when the airbag is deployed. The airbag may further include a longitudinal tether secured to the lower rear portion to limit longitudinal expansion of the inflatable cushion and form the concave surface in the lower rear portion.

16 Claims, 3 Drawing Sheets

(56) References Cited

U.S. PATENT DOCUMENTS

| | | | |
|---|---|---|---|
| 8,070,183 B2 * | 12/2011 | Kumagai et al. | 280/743.2 |
| 8,181,988 B2 * | 5/2012 | Adachi et al. | 280/729 |
| 8,196,957 B2 * | 6/2012 | Kubo et al. | 280/743.2 |
| 8,371,612 B2 * | 2/2013 | Williams | 280/743.2 |
| 8,419,049 B2 * | 4/2013 | Miyata | 280/729 |
| 8,434,786 B2 * | 5/2013 | Jang et al. | 280/743.2 |
| 2001/0040368 A1 * | 11/2001 | Okada et al. | 280/743.2 |
| 2003/0057691 A1 * | 3/2003 | Tokita et al. | 280/743.2 |
| 2006/0186656 A1 * | 8/2006 | Kumagai | 280/743.2 |
| 2007/0205591 A1 * | 9/2007 | Bito | 280/743.2 |
| 2007/0262572 A1 * | 11/2007 | Fischer et al. | 280/730.1 |
| 2010/0225094 A1 * | 9/2010 | Rose et al. | 280/729 |
| 2012/0205900 A1 * | 8/2012 | Mallinger et al. | 280/743.2 |
| 2013/0093171 A1 * | 4/2013 | Eckert et al. | 280/743.2 |

\* cited by examiner

_US 8,807,596 B1_

AIRBAG AND VEHICLE PASSENGER RESTRAINT SYSTEM

BACKGROUND

Car manufacturers continue to investigate ways to improve the performance of vehicle passenger restraint systems having airbags for front seat passengers. Typical restraint systems for front seat passengers include a powerful inflator device that deploys a somewhat large airbag to rapidly occupy a generally large volume of space aft of the windshield and the dashboard. Furthermore, the front passenger airbag can have a split lobe configuration to allocate more cushioning force on an occupant's shoulders, as compared to the occupant's head. To that end, these airbags can have multiple elongated thin straps that are individually sown to various portions of the airbag in order to provide the split lobe configuration. The somewhat large number and complicated configuration of these tethers can lead to cumbersome manufacture of the airbags thereby increasing costs related to the same.

A need exists for a passenger airbag that can be quickly deployed to reduce longitudinal translation of the airbag, require a lower cost of production and reallocate forces imparted by the airbag on portions of the occupant's body.

SUMMARY

A passenger airbag for a vehicle passenger restraint system may include an inflatable cushion, which has an upper rear portion with a convex surface and a lower rear portion with a concave surface when the airbag is deployed. The airbag may further include a longitudinal tether secured to the lower rear portion to limit longitudinal expansion of the inflatable cushion and form the concave surface in the lower rear portion.

A vehicle passenger restraint system may include a sensor configured to generate a detection signal in response to detecting a collision event. The system may also have a controller configured to receive the detection signal from the sensor and generate an actuation signal in response to the detection signal. In addition, the system may also have an inflator device configured to receive the actuation signal from the controller and produce gas in response to the actuation signal. The system may further have a passenger airbag coupled to the inflator device to receive gas from the inflator device. This airbag may include an inflatable cushion having an upper rear portion with a convex surface and a lower rear portion with a concave surface when the airbag is deployed. Moreover, the airbag may also have a longitudinal tether secured to the lower rear portion to limit longitudinal expansion of the inflatable cushion and form the concave surface in the lower rear portion. The airbag may also have a lateral tether traversing the longitudinal tether when the inflatable cushion is deployed, and a supplemental tether interconnecting the lateral tether and the lower rear portion.

DETAILED DESCRIPTION

Figure 1:
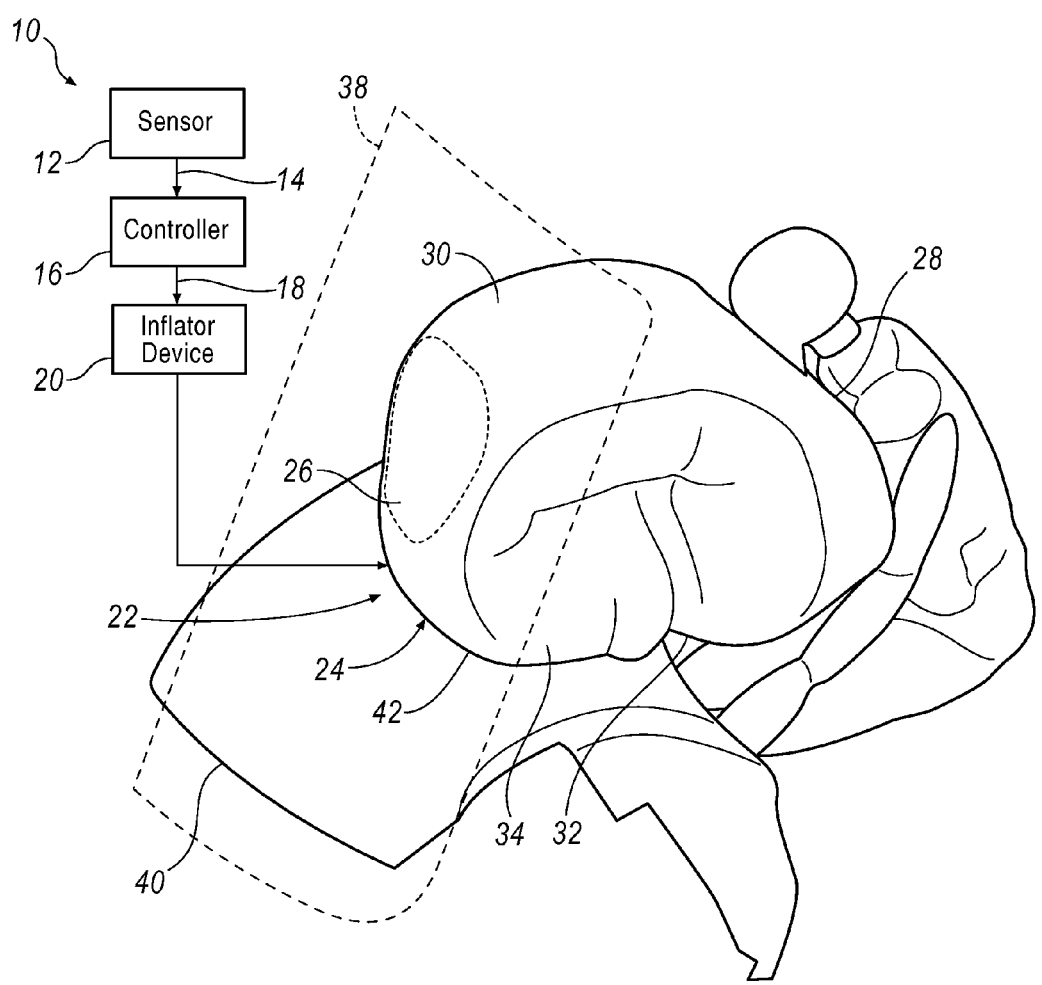
FIG. 1 illustrates an exemplary perspective view of a vehicle passenger restraint system having a deployed passenger airbag.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

An exemplary passenger airbag for a vehicle passenger restraint system may include an inflatable cushion having an upper rear portion with a convex surface and a lower rear portion with a concave surface when the airbag is deployed. The airbag may also have a longitudinal tether secured to the lower rear portion to limit longitudinal expansion of the inflatable cushion and form the concave surface in the lower rear portion. The concave surface and the convex surface may support an occupant's head and shoulders, while providing an initial predetermined clearance for the occupant's chest and reduce the occupant's chest deflection. However, the concave surface and the convex surface may perform in combination with one or another in other suitable ways or independently from each other to support various portions of the occupant.

Referring to FIG. 1, a vehicle passenger restraint system 10 may include one or more sensors 12 configured to generate a detection signal 14 in response to detecting a collision event. The system 10 may also have a controller 16, which is configured to receive the detection signal 14 from the sensor 12 and generate an actuation signal 18 in response to the detection signal. Further, the system 10 may have an inflator device 20, which is configured to receive the actuation signal from the controller 16 and produce gas in response to the actuation signal. In addition, the system 10 may have a passenger airbag 22 coupled to the inflator device 20 to receive gas therefrom.

Figure 2:
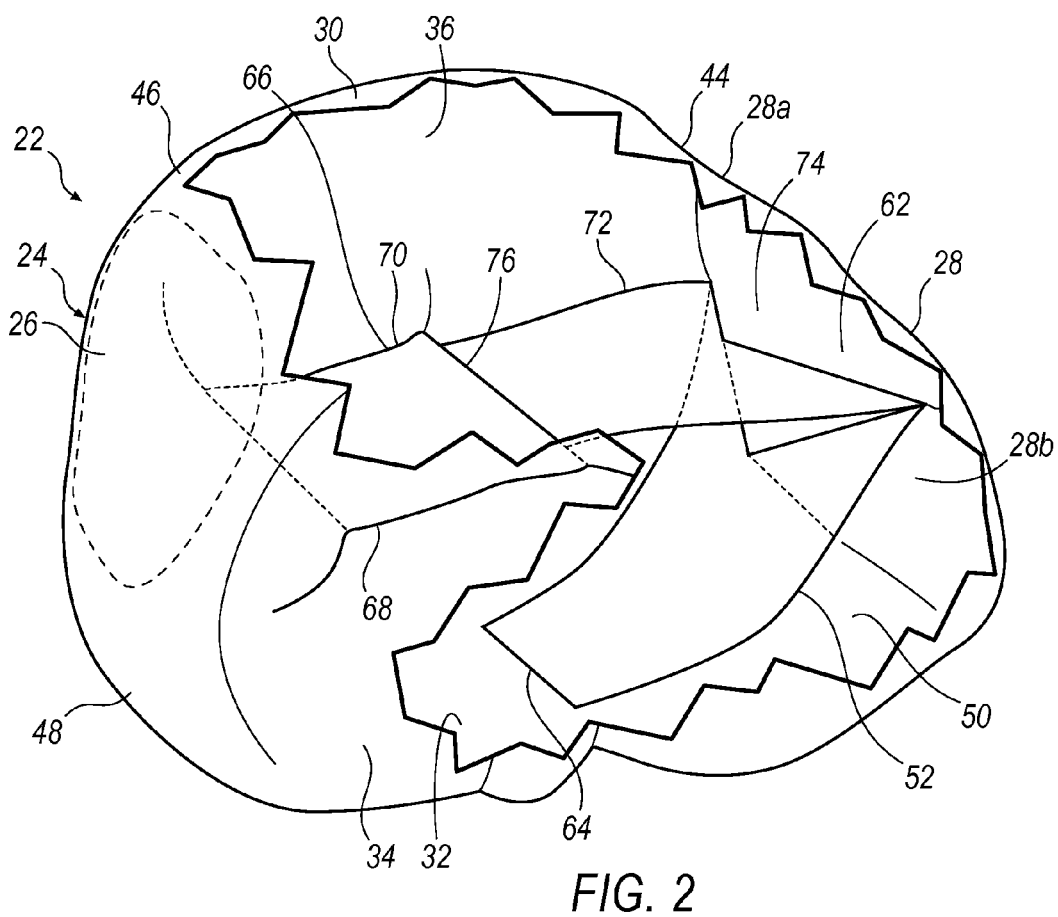
FIG. 2 is a rear view of the airbag of FIG. 1, showing the airbag with a portion cutaway to show the airbag having a lateral tether, a longitudinal panel tether and a supplemental tether.
Figure 3:
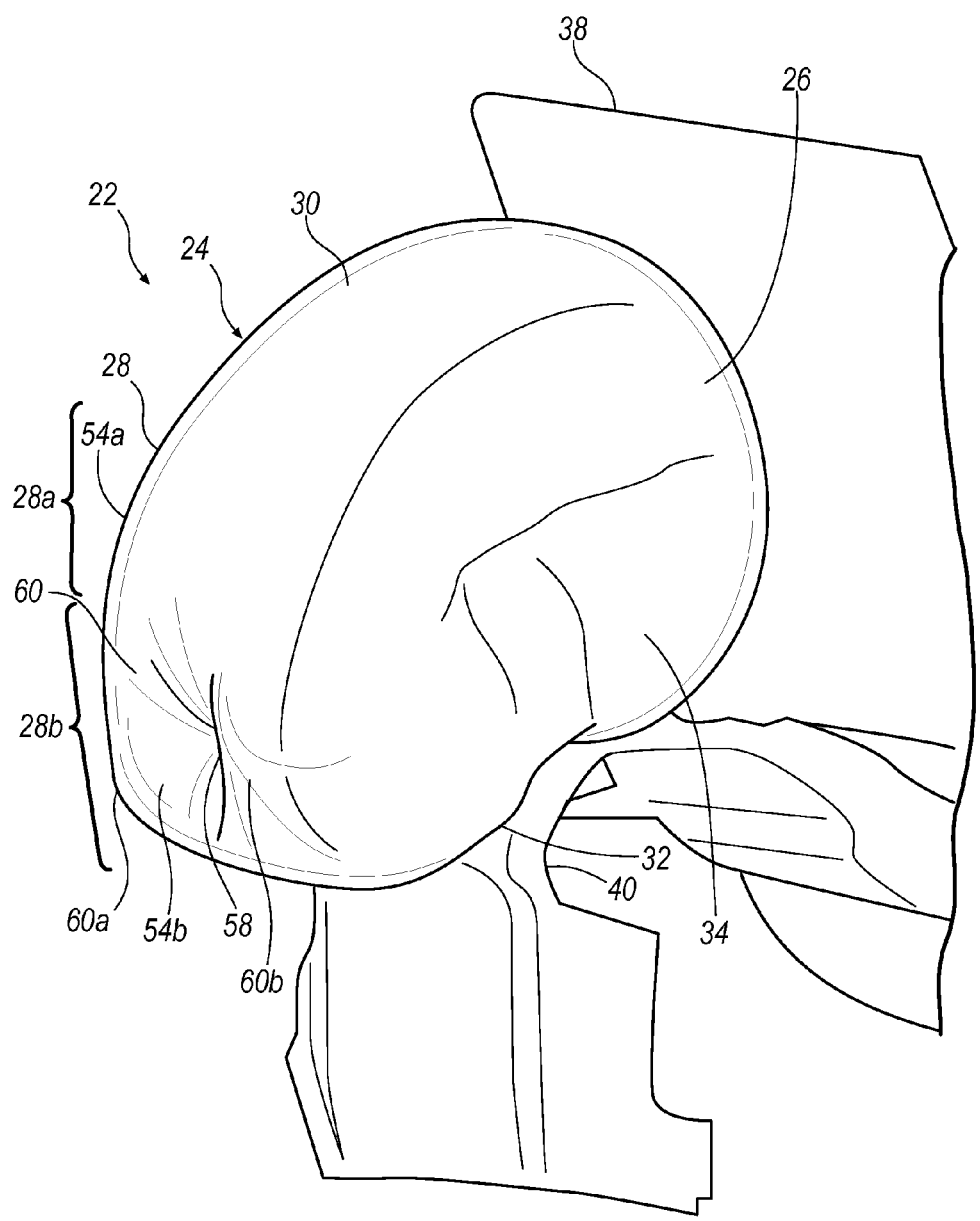
FIG. 3 is a rear perspective view of the airbag of FIG. 1, showing the airbag having a rear portion with a concave surface.

Referring now to FIGS. 1 and 2, a passenger airbag 22 may include an inflatable cushion 24 having a front portion 26, a rear portion 28, a top portion 30, a bottom portion 32 and a pair of side portions 34, 36 extending between the front and rear portions. As best shown in FIG. 3, the rear portion 28 may include an upper rear portion 28a with a convex surface 54a configured to support, for example, a head of a vehicle occupant when the airbag is deployed during a collision event. The convex surface 54a of the upper rear portion 28a may extend upward and rearward from a lower rear portion 28b of the airbag. In addition, the rear portion 28 may also include a lower rear portion 28b with a concave surface 54b configured to support, for example, the shoulders of a vehicle occupant and provide an initial predetermined clearance for the occupant's chest when the airbag is deployed during a collision event, so as to reduce a force applied to the chest thereby reducing chest deflection. In particular, the concave surface 54b may include a recess 58 contiguously surrounded by a raised peripheral section 60 that may be disposed further rearward of the recess when the airbag is deployed. This peripheral section may have a pair of opposing sides 60a and 60b with respect to the recess 58, such that the sides 60a and 60b contact and support the occupant's shoulders before the recess 58 receives and supports the occupant's chest. However, it is contemplated that the recess 58 and peripheral section 60 may have other suitable configurations. Furthermore, the concave surface 54b may provide the lower rear portion 28b with a mean surface that is disposed in a substantially vertical plane when the airbag is deployed. In addition, the upper rear portion 28a may have an upper height or length, and the lower rear portion may have a lower height or length that may be substantially equal to the upper height. It is contemplated that the upper rear portion and the lower rear portion may have other suitable configurations for supporting various portions of the occupant's body.

The front portion 26 may be configured to contact and support the inflated airbag 22 against a windshield 38, a dashboard 40, other suitable vehicle structures or any combinations thereof. Furthermore, the cushion may define up to one non-split lobe 42. However, it is understood that the cushion may define two or more split lobes. In addition, the front, rear, top, bottom and side portions may be integral portions of one or more pieces that wrap or extend around the perimeter of the airbag. For example, as best shown in FIG. 2, the airbag 22 in this form may include one textile piece including the rear portion 28, the top portion 30 extending from an upper portion 44 of the rear portion, the front portion 26 extending from a forward portion 46 of the top portion, and the bottom portion 32 extending from a lower portion 48 of the front portion and terminating at an end sown or otherwise attached to a lower portion 50 of the rear portion 28. Similarly, the side portions 34, 36 may be integral parts of this textile piece and extend from any suitable portion of the airbag. However, any one or more of these portions may be a separate textile piece sown or otherwise attached to the other portions.

As best shown in FIG. 2, the airbag 22 may include one or more longitudinal tethers 52 attached to the lower rear portion 28b, such that when the airbag 22 is deployed, the longitudinal tether 52 inhibits the lower rear portion 28b from expanding further rearward, and the lower rear portion 28b forms the concave surface 54 (FIG. 3) noted above. Referring back to FIG. 2, the airbag 22 in this form may have only one longitudinal tether 52, and this tether may be made of a sheet or panel having one elongated edge 62 that is sown or otherwise secured to the lower rear portion 28b contiguously along the length of the elongated edge 62. The elongated edge may have two linear segments disposed at angle with respect to each other in order to evenly pull the inflatable cushion and form the concave surface without causing any tears during deployment of the airbag. However, the elongated edge 62 may be more or less than two linear segments, be non-linear or have one or more portions that are not secured to the cushion. Furthermore, the elongated edge 62 may span at least half the width of the lower rear portion. It is contemplated that the elongated edge may be longer or shorter than half the width of the lower rear portion. The longitudinal tether 52 may further include an opposite angled, linear or non-linear elongated edge 64 that is sown or otherwise attached to the bottom portion 32. Further, this tether may be a flat contiguous panel without any openings or apertures therein. The longitudinal tether may have other suitable shapes or be anchored to other portions of the airbag other than the bottom portion.

Referring again to FIG. 2, the airbag 22 may further include one or more lateral tethers 66 attached to one or both of the side portions 34, 36 to limit lateral inflation of the airbag thereby decreasing power requirements for the inflator and expediting longitudinal inflation of the airbag to support the front portion 26 against the windshield 38, dashboard 40 or other vehicle structures (FIGS. 1 and 3). Of course, the lateral tethers may be utilized for performing other functions as desired. The airbag 22 in this form may have one lateral tether 66 that perpendicularly traverses the longitudinal tether 52 when the airbag is deployed. The lateral tether may, however, be disposed in a non-perpendicular position with respect to the longitudinal tether. Furthermore, the lateral tether 66 may be a panel or sheet having one angled, linear or non-linear elongated edge 68 sown or otherwise attached to one side portion 34 and span at least one-fourth of a width of the side portion 34. The lateral tether 66 may also have an opposite angled, linear or non-linear elongated edge 70 sown or otherwise attached to the other side portion 36 and span at least one-fourth of a width of the side portion 36. It is contemplated that the elongated edges may be longer or shorter than one-fourth the width of the respective side portions. In addition, this tether may be a flat contiguous panel without any openings or apertures therein. The airbag may, however, include a lateral tether having other suitable shapes or be anchored to portions of the airbag other than the opposing side portion.

The airbag 22 may also have one or more supplemental tethers 72 interconnecting the lateral tether 66 and the lower rear portion 28b so as to both limit lateral expansion of the airbag and form the concave surface 54 in the rear portion 28. The airbag 22 in this form may have one supplemental tether 72 made of a panel or sheet having one rearward elongated edge 74 that is contiguously sown or otherwise attached to the lower rear portion 28b. The rearward elongated edge 74 may have two linear segments disposed at angle with respect to each other in order to evenly pull the inflatable cushion and form the concave surface without causing any tears during deployment of the airbag. However, the elongated edge 74 may have more or less than two linear segments or be non-linear, and the edge 74 may be non-contiguously secured to the cushion. The rearward elongated edge 74 may span at least half of the width of the lower rear portion 28b. It is contemplated that the elongated edge 74 may span more or less than one half the width of the lower rear portion. The supplemental tether 72 may also have a forward linear or non-linear elongated edge 76 that is contiguously sown or otherwise attached to the lateral tether 66 and spanning at least half of a length of the lateral tether 66. However, the forward elongated edge may be longer or shorter than one half the length of the supplemental tether. In addition, the supplemental tether may be a flat contiguous panel without any openings or apertures or have other suitable shapes. It is also contemplated that the supplemental tether and the lateral tether may be integral portions of a one-piece panel.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A passenger airbag for a vehicle passenger restraint system, comprising:
    an inflatable cushion including an upper rear portion with a convex outer surface and a lower rear portion with a concave outer surface when the airbag is deployed; and
    a longitudinal tether secured to the lower rear portion to limit longitudinal expansion of the inflatable cushion and form the concave outer surface in the lower rear portion;
    wherein the convex outer surface is configured to support a head of an occupant when the airbag is deployed, and the concave outer surface is configured to support a pair of shoulders of the occupant to provide an initial predetermined clearance for a chest of the occupant when the airbag is deployed;
    wherein the longitudinal tether has an elongated edge spanning at least half of a width of the lower rear portion; and
    wherein the elongated edge is secured to the lower rear portion contiguously along a length of the elongated edge.

2. The passenger airbag of claim 1 wherein the inflatable cushion defines up to one non-split lobe when the inflatable cushion is deployed.

3. The passenger airbag of claim 2 wherein the concave outer surface includes a pair of opposing sides and a recess disposed between the opposing sides, wherein the opposing sides are disposed rearward of the recess.

4. The passenger airbag of claim 1 wherein the concave surface has a mean surface disposed in a substantially vertical plane when the airbag is deployed.

5. The passenger airbag of claim 1 wherein the upper rear portion extends upward and forward from the lower rear portion.

6. The passenger airbag of claim 5 wherein the upper rear portion has an upper height and the lower rear portion has a lower height substantially equal to the upper height.

7. The passenger airbag of claim 1 further comprising a lateral tether traversing the longitudinal tether when the inflatable cushion is deployed.

8. The passenger airbag of claim 7 wherein the lateral tether is disposed perpendicularly to the longitudinal tether when the inflatable cushion is deployed.

9. The passenger airbag of claim 7 wherein the lateral tether is secured to opposing side portions of the inflatable cushion.

10. The passenger airbag of claim 7 wherein the lateral tether has an elongated edge spanning at least one-fourth of a width of a side portion of the inflatable cushion.

11. The passenger airbag of claim 7 wherein the lateral tether has a pair of ends that each have an elongated edge spanning at least one fourth of a width of the respective opposing side portion.

12. The passenger airbag of claim 11 wherein the elongated edge is secured to the respective side portion contiguously along a width of the elongated edge.

13. The passenger airbag of claim 12 wherein the inflatable cushion defines up to one non-split lobe when the inflatable cushion is deployed.

14. The passenger airbag of claim 7 further comprising a supplemental tether interconnecting the lateral tether and the lower rear portion.

15. The passenger airbag of claim 14 wherein the supplemental tether has a forward elongated edge and a rearward elongated edge, wherein the forward elongated edge is contiguously secured to the lateral tether, and the rearward elongated edge is contiguously secured to the lower rear portion.

16. The passenger airbag of claim 14 wherein the rearward elongated edge of the supplemental tether includes at least two linear segments disposed at an angle with respect to one another to form the concave surface in the lower rear portion.

* * * * *